United States Patent
Diehl

(10) Patent No.: US 11,481,786 B2
(45) Date of Patent: Oct. 25, 2022

(54) GENUINE INSTANCE OF DIGITAL GOODS

(71) Applicants: Sony Corporation, Tokyo (JP); Sony Pictures Entertainment Inc., Culver City, CA (US)

(72) Inventor: Eric Diehl, Culver City, CA (US)

(73) Assignees: Sony Group Corporation, Tokyo (JP); Sony Pictures Entertainment Inc., Culver City, CA (US)

(*) Notice: Subject to any disclaimer, the term of this patent is extended or adjusted under 35 U.S.C. 154(b) by 156 days.

(21) Appl. No.: 15/921,028

(22) Filed: Mar. 14, 2018

(65) Prior Publication Data

US 2019/0102782 A1    Apr. 4, 2019

Related U.S. Application Data

(60) Provisional application No. 62/567,698, filed on Oct. 3, 2017.

(51) Int. Cl.
*G06Q 30/00* (2012.01)
*H04L 9/32* (2006.01)
*H04L 9/00* (2022.01)

(52) U.S. Cl.
CPC ....... *G06Q 30/0185* (2013.01); *H04L 9/3239* (2013.01); *H04L 9/3247* (2013.01);
(Continued)

(58) Field of Classification Search
CPC . G06Q 30/0185; H04L 9/3239; H04L 9/3247; H04L 9/3263; H04L 9/3268
See application file for complete search history.

(56) References Cited

U.S. PATENT DOCUMENTS

| 2005/0049929 A1* | 3/2005 | Hsu | G06Q 20/02 |
| | | | 705/64 |
| 2006/0178995 A1* | 8/2006 | Diehl | G11B 20/00086 |
| | | | 705/50 |

(Continued)

FOREIGN PATENT DOCUMENTS

| RU | 2534952 C1 | 12/2014 |
| WO | WO0144968 A2 * | 10/2000 |

(Continued)

OTHER PUBLICATIONS

Zhu, Xiao; Autonomic Identity Framework (IOT), 2017 (Year: 2017).*

(Continued)

*Primary Examiner* — Jacob C. Coppola
*Assistant Examiner* — Terry Nathan Murray
(74) *Attorney, Agent, or Firm* — Procopio, Cory, Hargreaves & Savitch LLP

(57) ABSTRACT

Processing a genuine instance of a digital good using a blockchain including: registering an ownership of the genuine instance using a plurality of transactions, the genuine instance uniquely identified by a content descriptor which is cryptographically linked to an ownership token and includes intrinsic characteristics of the genuine instance, wherein the ownership token includes a token seed and a token signature; validating each transaction of the plurality of transactions by a plurality of validators; and recording that the genuine instance belongs to an owner by recording each transaction of the plurality of transactions in the blockchain once each transaction has been validated.

18 Claims, 10 Drawing Sheets

(52) U.S. Cl.
CPC .......... *H04L 9/3263* (2013.01); *H04L 9/3268* (2013.01); *H04L 9/3271* (2013.01); *G06Q 2220/00* (2013.01); *H04L 9/50* (2022.05)

(56) References Cited

U.S. PATENT DOCUMENTS

| | | | |
|---|---|---|---|
| 2007/0091377 A1* | 4/2007 | Smith | C09D 11/50 358/3.28 |
| 2013/0018800 A1* | 1/2013 | Devaraju | G06Q 20/3823 705/75 |
| 2013/0166455 A1 | 6/2013 | Feigelson | |
| 2015/0059003 A1* | 2/2015 | Bouse | G06F 16/2228 726/28 |
| 2016/0098723 A1* | 4/2016 | Feeney | G06Q 20/4016 705/75 |
| 2016/0203572 A1 | 7/2016 | McConaghy et al. | |
| 2016/0234026 A1 | 8/2016 | Wilkins | |
| 2016/0283920 A1* | 9/2016 | Fisher | G06Q 20/02 |
| 2017/0206523 A1* | 7/2017 | Goeringer | G06F 21/45 |
| 2018/0089655 A1* | 3/2018 | Mcdonald | G06Q 20/065 |
| 2018/0176017 A1* | 6/2018 | Rodriguez | H04L 63/08 |
| 2019/0005268 A1* | 1/2019 | Gupta | G06F 21/6209 |

FOREIGN PATENT DOCUMENTS

| | | |
|---|---|---|
| WO | WO-2016164496 A1 | 10/2016 |
| WO | 2017079214 A1 | 5/2017 |
| WO | 2017145003 | 8/2017 |
| WO | 2017145010 A1 | 8/2017 |

OTHER PUBLICATIONS

Toyoda, Kentaroh; Ownership Management System; 2017 (Year: 2017).*
Bisbee, Stephen; EP1617590 B1 (Machine Translation), 2006 (Year: 2006).*
International Search Report and Written Opinion for corresponding PCT application No. PCT/US2018/053705, dated Jan. 31, 2019, in 8 pages.

* cited by examiner

GENUINE INSTANCE OF DIGITAL GOODS

CROSS-REFERENCE TO RELATED APPLICATIONS

This application claims the benefit of priority under 35 U.S.C. § 119(e) of U.S. Provisional Patent Application No. 62/567,698, filed Oct. 3, 2017, entitled "Genuine Instance of Digital Good." The disclosure of the above-referenced application is incorporated herein by reference.

BACKGROUND

Field

The present disclosure relates to genuine instance of digital goods, and more specifically, to validating the genuine instance.

Background

A good is rival if once consumed it is not anymore available. A good is excludable if it is possible to restrict its usage to an individual or a group of individuals. Digital goods are by nature non-excludable and non-rival. In some cases, these intrinsic characteristics may be a business issue. As scarcity is driving value, non-excludability and non-rivalry may be disadvantageous to business. However, digital goods are by nature not scarce, thus with little intrinsic commercial value.

SUMMARY

The present disclosure provides for creating the scarcity with one unique instance of a digital good that will be the genuine instance and for linking that genuine instance to an owner.

In one implementation, a method for processing a genuine instance of a digital good using a blockchain is disclosed. The method includes: registering an ownership of the genuine instance using a plurality of transactions, the genuine instance uniquely identified by a content descriptor which is cryptographically linked to an ownership token and includes intrinsic characteristics of the genuine instance, wherein the ownership token includes a token seed and a token signature; validating each transaction of the plurality of transactions by a plurality of validators; and recording that the genuine instance belongs to an owner by recording each transaction of the plurality of transactions in the blockchain once each transaction has been validated.

In one implementation, the intrinsic characteristics include: a unique identifier of the genuine instance which is calculated as a one-way cryptographic hash of the token seed; a payload of an imperceptible watermark embedded in the genuine instance; an instance hash of the plurality of transactions; and a content signature signed by the owner of a previous transaction. In one implementation, the ownership token includes information that links the genuine instance to the owner. In one implementation, registering an ownership of the genuine instance is performed by an issuer. In one implementation, intrinsic characteristics include: a unique identifier of the genuine instance which is calculated as a one-way cryptographic hash of the token seed; a payload of an imperceptible watermark embedded in the genuine instance; an instance hash of the plurality of transactions; a content signature signed by the issuer; and a certificate key of the issuer. In one implementation, validating each transaction includes: verifying the validity of the content signature; and verifying the validity of the ownership token. In one implementation, verifying the validity of the ownership token in a resale includes: verifying the validity of the token seed; and verifying that the token signature is an actual signature of the token seed submitted by the owner in a previous transaction. In one implementation, each transaction includes: a transaction signature signed by the issuer; and a certificate key of the owner. In one implementation, the method further includes generating, by the issuer, an initial random seed, wherein the initial random seed enables the creation of a finite series of successive token seeds, each token seed being a one-way cryptographic hash of the token seed generated in a previous transaction. In one implementation, the method further includes generating the unique identifier of the genuine instance with a single iteration of a one-way hash function of a last element of the finite series for an initial sale of the genuine instance. In one implementation, the method further includes: appointing a certification authority by the plurality of validators; and generating key pairs and associated certificates used for identity management by the certification authority. In one implementation, generating key pairs and associated certificates includes: verifying that the associated certificates did not expire; and verifying that the associated certificates were signed by the certification authority. In one implementation, the content descriptor also includes a set of visible marks that is unique to the genuine instance. In one implementation, the ownership token also includes a token signature of the token seed. In one implementation, registering an ownership of the genuine instance is performed by the owner in a previous transaction. In one implementation, the method further includes: generating, by the owner in the previous transaction, a new ownership token by signing the token seed with a private key of the owner in the previous transaction; and generating a suite of linked token seeds.

In another implementation, a non-transitory computer-readable storage medium storing a computer program to process a genuine instance of a digital good using a blockchain is disclosed. The computer program includes executable instructions that cause a computer to: register an ownership of the genuine instance using a plurality of transactions, the genuine instance uniquely identified by a content descriptor which is cryptographically linked to an ownership token and includes intrinsic characteristics of the genuine instance, wherein the ownership token includes a token seed and a token signature; validate each transaction of the plurality of transactions by a plurality of validators; and recording that the genuine instance belongs to an owner by recording each transaction of the plurality of transactions in the blockchain once each transaction has been validated.

In yet another implementation, a system for processing a genuine instance of a digital good using a blockchain is disclosed. The system includes: an issuer configured to register an ownership of the genuine instance using a plurality of transactions, the genuine instance uniquely identified by a content descriptor which is cryptographically linked to an ownership token and includes intrinsic characteristics of the genuine instance, wherein the ownership token includes a token seed and a token signature; and a plurality of validators configured to validate each of the plurality of transactions, wherein the genuine instance is recorded as belonging to an owner by recording each transaction of the plurality of transactions in the blockchain once each transaction has been validated by the plurality of validators.

In one implementation, the intrinsic characteristics include: a unique identifier of the genuine instance which is calculated as a one-way cryptographic hash of the token seed; a payload of an imperceptible watermark embedded in the genuine instance; an instance hash of the plurality of transactions; and a content signature signed by the owner in a previous transaction. In one implementation, the system further includes a watermark detector configured to detect and extract the payload of the imperceptible watermark embedded in the genuine instance. In one implementation, the ownership token includes information that links the genuine instance to the owner. In one implementation, the system further includes a certification authority configured to generate key pairs and associated certificates used for identity management.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, although scarcity drives value, digital goods are by nature not scarce, and thus may have little commercial value.

Certain implementations of the present disclosure provide for creating the scarcity with one unique instance of a digital good that will be the genuine instance and for linking that genuine instance to an owner. All copies of the genuine instance handled by an entity other than the proprietor would not be genuine instances, although they may be bit-to-bit copies of the genuine instance. All derived versions, such as compressed or resized instances, would not be genuine instances, regardless of the ownership. Thus, in the present disclosure, a genuine instance is a digital file with one unique owner. The present disclosure aims to link a digital file to an owner, and to trace and verify this ownership. In one implementation, this link and ownership is implemented using a blockchain concept.

Digital signatures and digital rights management may be used to verify the integrity of an instance. However, the digital signature does not discriminate the genuine instance from copied instances. Although the digital rights management is a set of technologies that create artificial scarcity for digital goods, they do not fulfill the expected features. That is, although the digital rights management controls access to the digital goods, it does not handle its uniqueness and ownership.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

The blockchain data structure is an ordered list of blocks. Each block points back to its predecessor until the first block, which is sometimes referred to as the genesis block. The blocks and their sequencing are protected in integrity by backward-linking of cryptographic hashes. There are many blockchains and usage of blockchains, but the most famous ones are Bitcoin and Ethereum.

Figure 1:
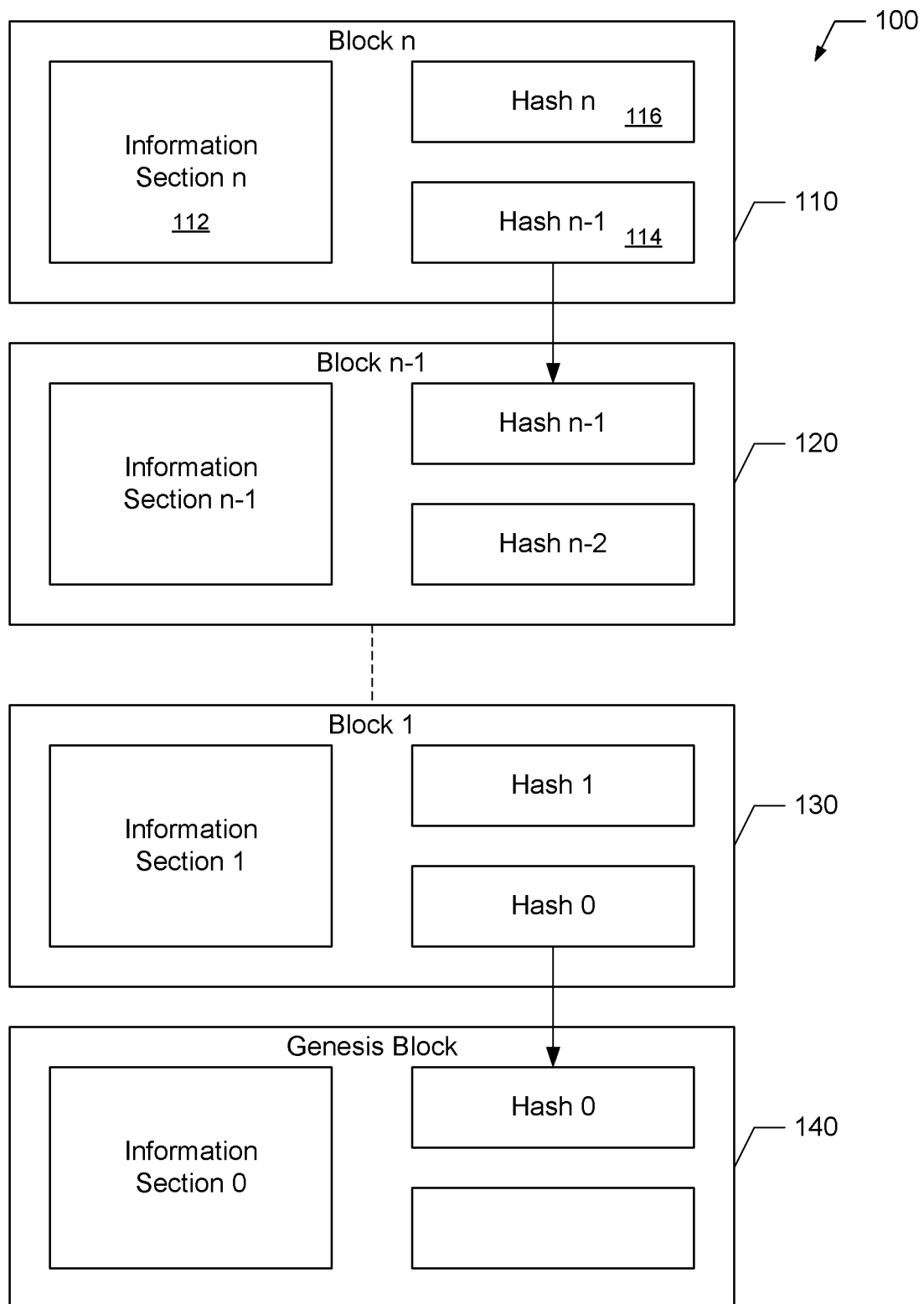
FIG. 1 is a block diagram of a blockchain including n blocks and a genesis block.

FIG. 1 is a block diagram of a blockchain 100 including n blocks 110, 120, 130 and a genesis block 140. In one implementation, a block has at least three elements: (a) an information section (e.g., 112) that stores the registered data and ancillary data, wherein the information section may be signed to prove its authenticity; (b) the cryptographic hash (e.g., 114) of the previous block (the genesis block will not have a previous block); and (c) the cryptographic hash (e.g., 116) of the current block. Thus, the data structure of the blockchain provides an append-only global ledger, which is tamper evident.

Figure 2:
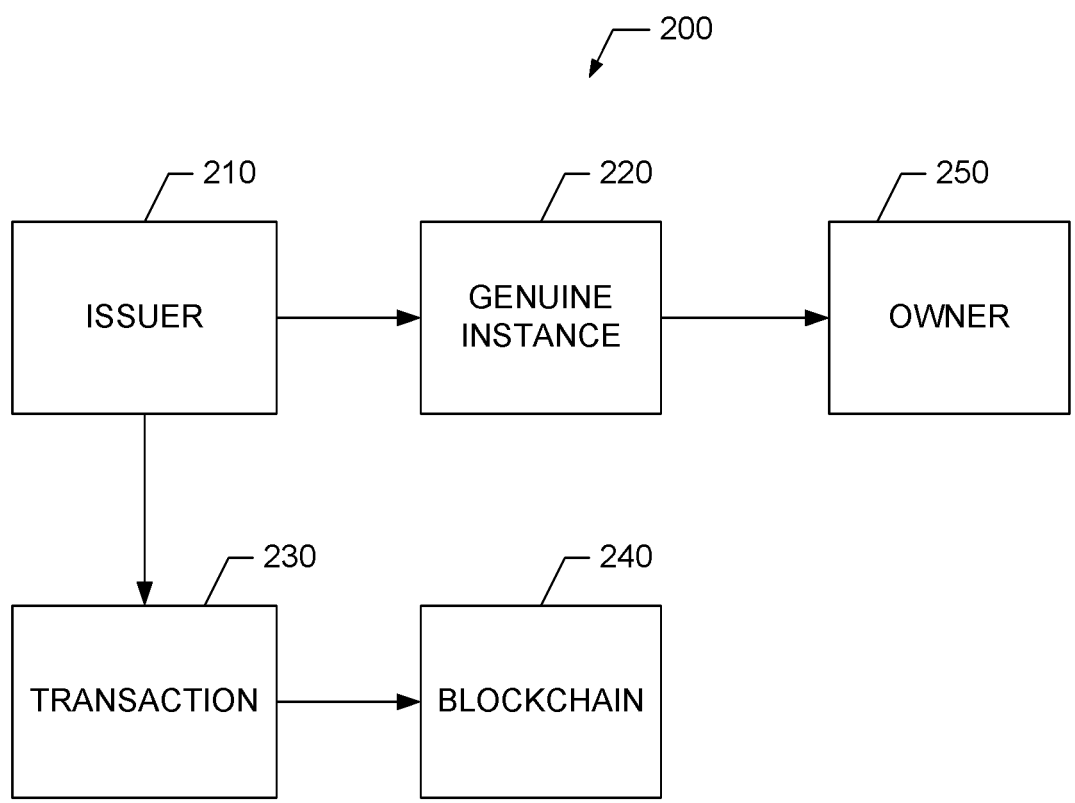
FIG. 2 is a block diagram of a blockchain-based system for processing a genuine instance of a digital good in accordance with one implementation of the present disclosure.

FIG. 2 is a block diagram of a blockchain-based system 200 for processing a genuine instance of a digital good in accordance with one implementation of the present disclosure. The blockchain-based system 200 of FIG. 2 includes an issuer 210, a genuine instance 220, a transaction 230, and a blockchain 240.

Figure 3:
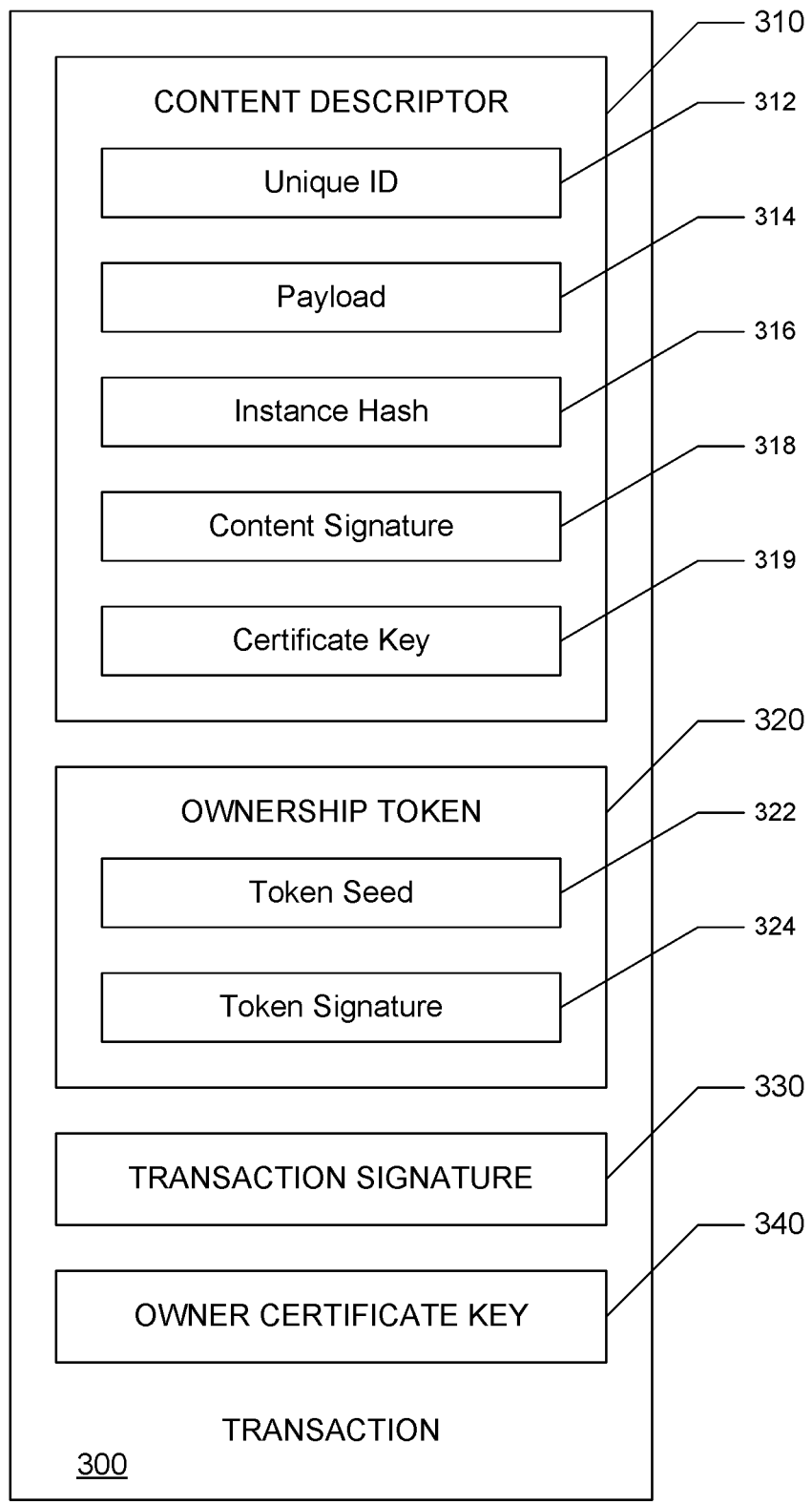
FIG. 3 is a block diagram of a transaction including a content descriptor, an ownership token, a transaction signature, and an owner certificate key, in accordance with one implementation of the present disclosure.

In one implementation, the transaction 230 registers the ownership of the genuine instance 220 and the issuer 210 creates and delivers the genuine instance 220 to an initial owner 250. Each genuine instance 220 is uniquely identified by a unique combination of intrinsic characteristics referred to as a content descriptor which is illustrated in FIG. 3. The issuer 210 generates the initial transaction 230. The blockchain 240 holds every transaction 230 generated by the issuer 210.

FIG. 3 is a block diagram of a transaction 300 including a content descriptor 310, an ownership token 320, a transaction signature 330, and an owner certificate key 340, in accordance with one implementation of the present disclosure. In the illustrated implementation of FIG. 3, the content descriptor 310 includes a unique identifier (Unique ID) 312 of the genuine instance 220, a payload 314, an instance hash 316, a content signature 318, and an issuer certificate key 319. The content descriptor 310 may also include an optional set of visible marks that is unique to the genuine instance 220 (similar to the printing number in a series of lithography).

In one implementation, the payload 314 corresponds to the actual payload of an imperceptible watermark embedded in the genuine instance 220 and is unique to the genuine instance 220. The watermark is a unforgeable method to make the genuine instance unique for a given digital good. Depending on the type of media of the genuine instance 220, the imperceptible watermark may be invisible, inaudible, or text-based. In one implementation, the cryptographic instance hash 316 is a cryptographic digest of the essence of the genuine instance 220. In one implementation, the content signature 318 is a digital signature of the previous parameters signed by the issuer 210 (similar to the signature of the painter on lithography).

In one implementation, the ownership token 320 is digital information that links the genuine instance 220 to its owner 250, and includes a token seed 322 and a token signature 324. Unique ID is equal to f(token seed), where f is a function that is computationally difficult to reverse (e.g., a one-way cryptographic hash). The token signature 324 is a digital signature of the token seed issued by the issuer 210.

In one implementation, the ownership of each genuine instance 220 is recorded by the transaction 300 that holds the content descriptor 310, the ownership token 320, and an owner's certificate key 340. The issuer 210 signs the transaction 300 with the transaction signature 330. The validation of a transaction 300 verifies the content signature 318 and the validity of the ownership token 320. The blockchain 240 records any change of ownership of a genuine instance 220 by adding a new transaction 300 describing the transfer of ownership in the information section of a new block. The change of ownership may use one of two methods (one involving an issuer and another not involving an issuer).

In the first method (not involving an issuer), the seller, who is the current owner of the genuine instance, generates a new ownership token 320 by signing the token seed 322 with the seller's private key (i.e., owner's private key of the previous transaction). The new transaction 300 holds the content descriptor 310, the new ownership token 320 signed by the seller, the certificate key of the future owner 340, and is signed by the seller. A new block with the transaction 300 is stored on the blockchain 240.

In the second method (involving an issuer), the issuer 210 generates an initial random seed when creating the genuine instance 220. The initial random seed enables the creation of a suite of N linked token seeds as shown below. In one implementation, the initial random seed enables the creation of a finite series of successive token seeds, each token seed being a one-way cryptographic hash of the token seed generated in a previous transaction. The issuer keeps this initial random seed confidentially. The issuer 210 also defines a transaction threshold N and calculates the transactions as follows:

$$T_0 = f(\text{Initial Random Seed})$$

$$T_1 = f(T_0) = f(f(\text{InitialRandomSeed}))$$

$$T_{n-1} = f(T_{n-2})$$

$$\text{UniqueID} = f(T_{N-1})$$

Accordingly, the initial token seed 322 is the $N^{th}$ iteration, i.e. $T_{N-1}$, of f with the initial random seed. When resold, the token seed of the new transaction is $T_{N-2}$. In case of the $n^{th}$ resale, the new token seed 322 is the $(N-n)^{th}$ iteration of f. In one implementation, the one-way function f is a secure hash algorithm 3 (SHA3) with an output of 256 bits, and N=100.

For the initial sale, UniqueID=f(token seed), while for the first resale, UniqueID=f(f(token seed)), and so on. However, only the issuer 210 can calculate the new value of the token seed 322 since only the issuer 210 knows the initial random seed. The new transaction 300 uses the initial content descriptor 310, the new ownership token 320 signed by the issuer, the certificate key of the future owner, and is signed by the seller. A new block with this transaction 300 is stored on the blockchain.

In the descriptions below, following notations are used. For an asymmetric key pair, the prefix $K_{pri}$ represents the private key, whereas the prefix $K_{pub}$ represents the public key. Notation $\text{Enc}_{\{K_{pub}\}}(m)$ represents the encryption of clear text m using the public key $K_{pub}$. Notation $\text{De}_{\{K_{pri}\}}(m')$ represents the decryption of ciphertext m' using the private key $K_{pri}$. If $K_{pri}$ and $K_{pub}$ are a public-private key pair then $\text{Dec}_{\{K_{pri}\}}(\text{Enc}_{\{K_{pub}\}}(m))=m$. Notation $\text{Sign}_{\{K_{pri}\}}(m)$ represents the digital signature message m using the private key $K_{pri}$. Notation $\text{Ver}_{\{K_{pub}\}}(m,s)$ represents the digital verification of the signature s of message m using the public key $K_{pub}$. If $K_{pri}$ and $K_{pub}$ are a public-private key pair then $\text{Ver}_{\{K_{pub}\}}(m,\text{Sign}_{\{K_{pri}\}}(m))=\text{true}$.

Figure 4:
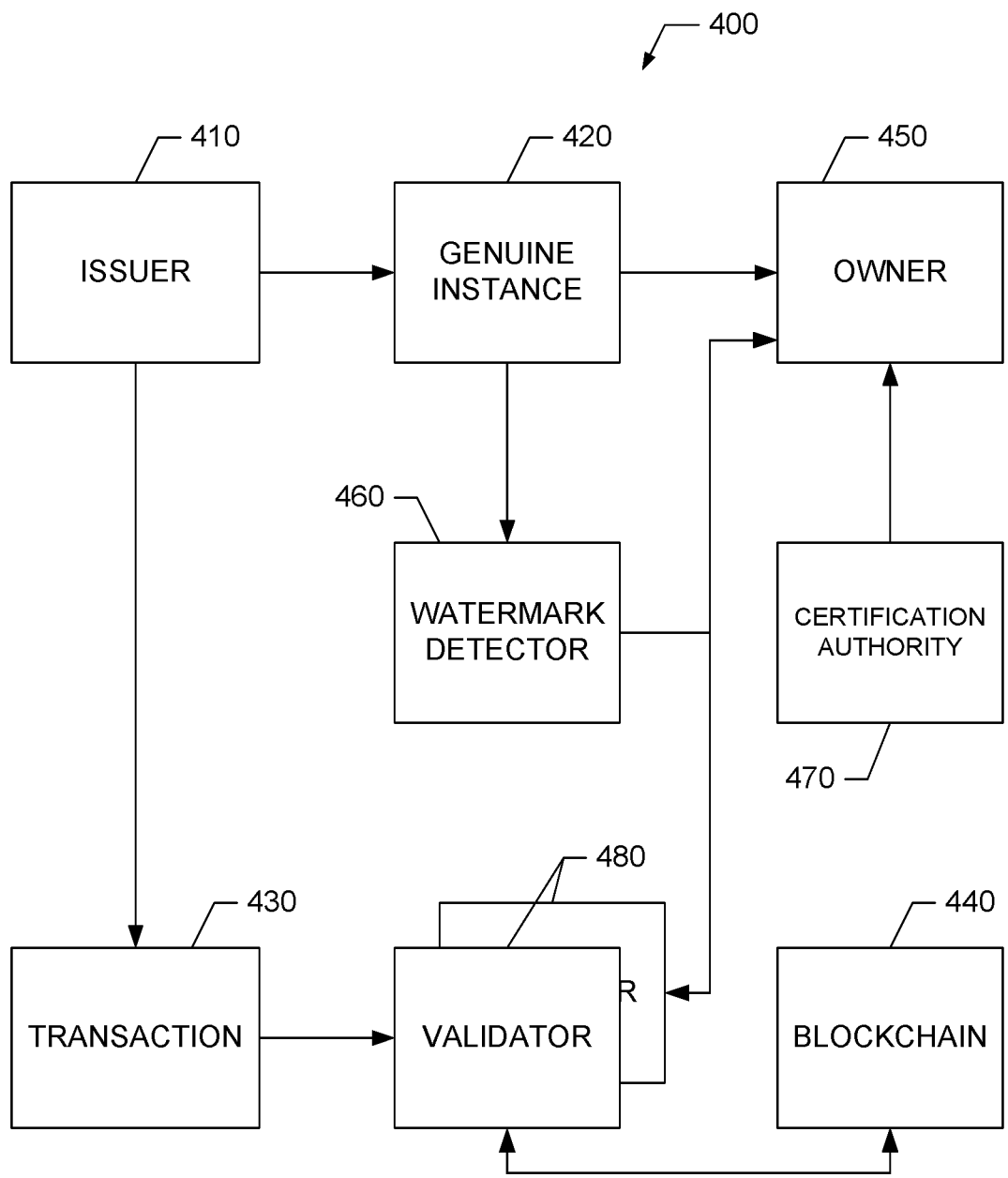
FIG. 4 is a block diagram of a blockchain-based system for processing a genuine instance of a digital good in accordance with another implementation of the present disclosure.

FIG. 4 is a block diagram of a blockchain-based system 400 for processing a genuine instance of a digital good in accordance with another implementation of the present disclosure. The blockchain-based system 400 of FIG. 4 includes an issuer 410, a genuine instance 420, a transaction 430, a blockchain 440, a watermark detector 460, a certification authority 470, and a set of validators 480.

In one implementation, the set of validators 480 uses a consensus mechanism based on the Practical *Byzantine* Fault Tolerant agreement (PBFT) to add the new blocks. In one implementation, the set of validators 480 appoints a trusted certification authority 470 to generate key pairs and associated certificates used for identity management. The validation of a certificate is a known process that implies verifying the consistency of the information including verifying that the certificate did not expire and was signed by the trusted certification authority 470.

In one implementation, regarding the cryptographic material used by the system 400 during the generation of the transaction 430, the issuer 410 has issuer's public key ($K_{pub\_issuer}$) and issuer's private key ($K_{pri\_issuer}$). The issuer 410 also has an issuer's certificate key issued by the certification authority 470 which is associated with the issuer's public key. In one implementation, the system 400 uses a hierarchical structure whose root certification authority is the certification authority 470. In one particular implementation, the system 400 uses Rivest, Shamir, and Adelman 2048 (RSA2048) Public Key Cryptographic Standard 1.5 (PKCS1.5), while the issuer certificate key is X509 compliant, which is a standard defining the format of a certificate of public key.

In one implementation, the owner 450 has an owner's public key ($K_{pub\_owner}$) and an owner's private key ($K_{pri\_owner}$). The owner 450 also has an owner's certificate key issued by the certification authority and is associated with the issuer's public key. In one particular implementation, the system uses RSA2048 PKCS1.5, while the owner certificate key is X509 compliant.

An example first sale of a genuine instance 420 of a digital good is described below. Alice sells a genuine instance of a digital picture to Bob. Thus, in this example, Alice is the issuer and Bob is the future owner.

In the above-described example implementation, Alice performs the following operations: (1) generates a 256-bit random seed; (2) performs 100 iterations of SHA3 on the initial random seed which results in a token seed 322 (i.e., TokenSeed=SHA3$_{100}$ (SHA3$_{99}$ ( . . . SHA3$_2$ (SHA3$_1$ (random seed))))); (3) calculates Unique ID 312 (i.e., UniqueID=SHA3(TokenSeed)) (in the highly unlikely case that UniqueID has already been used for another genuine instance, a new random seed would be polled); (4) generates a 32-bit random payload 314; (5) embeds the random payload 314 into the digital good using a watermark embedder to produce the genuine instance 420; (6) calculates instance hash 316 (i.e., InstanceHash=SHA3(GenuineInstance)) whose length is 256 bits; (7) calculates the content signature 318 (ContentSignature=Sign_RSA$_{\{Kpri\_issuer\}}$ (UniqueID|Payload InstanceHash|IssuerCertificateKey)); (8) builds the content descriptor by aggregating the Unique ID 312, the Payload 314, the instance hash 316, the issuer certificate key 319, and the content signature 318; (9) stores the Unique ID 312 and the random seed in a secure private database; (10) calculates the token signature 324 (i.e., TokenSignature=Sign_RSA$_{\{Kpri\_issuer\}}$ (TokenSeed)); (11) calculates the transaction signature 330 by signing the content descriptor 310, the ownership token 320, and Bob's owner certificate key 340 (i.e., TransactionSignature=Sign_RSA$_{\{Kpri\_issuer\}}$ (ContentDescriptor|OwnershipToken|OwnerCertificateKey)); (12) builds the transaction 430 by aggregating the content descriptor 310, the ownership token 320, the transaction signature 330, and the owner certificate key 340; and (13) submits the transaction 430 to the validators 480.

As described above in relation to FIG. 2, the blockchain 440 is a permissioned blockchain, which means that a fixed set of known trusted validators validates each new block. In one implementation, the validators 480 are a set of servers managed by the issuer 410 (or a consortium of issuers) that handles the blockchain. Further, the blockchain 440 is public, which means that anybody can consult it. However, only a validator can add a new block to the blockchain 440.

Figure 5A:
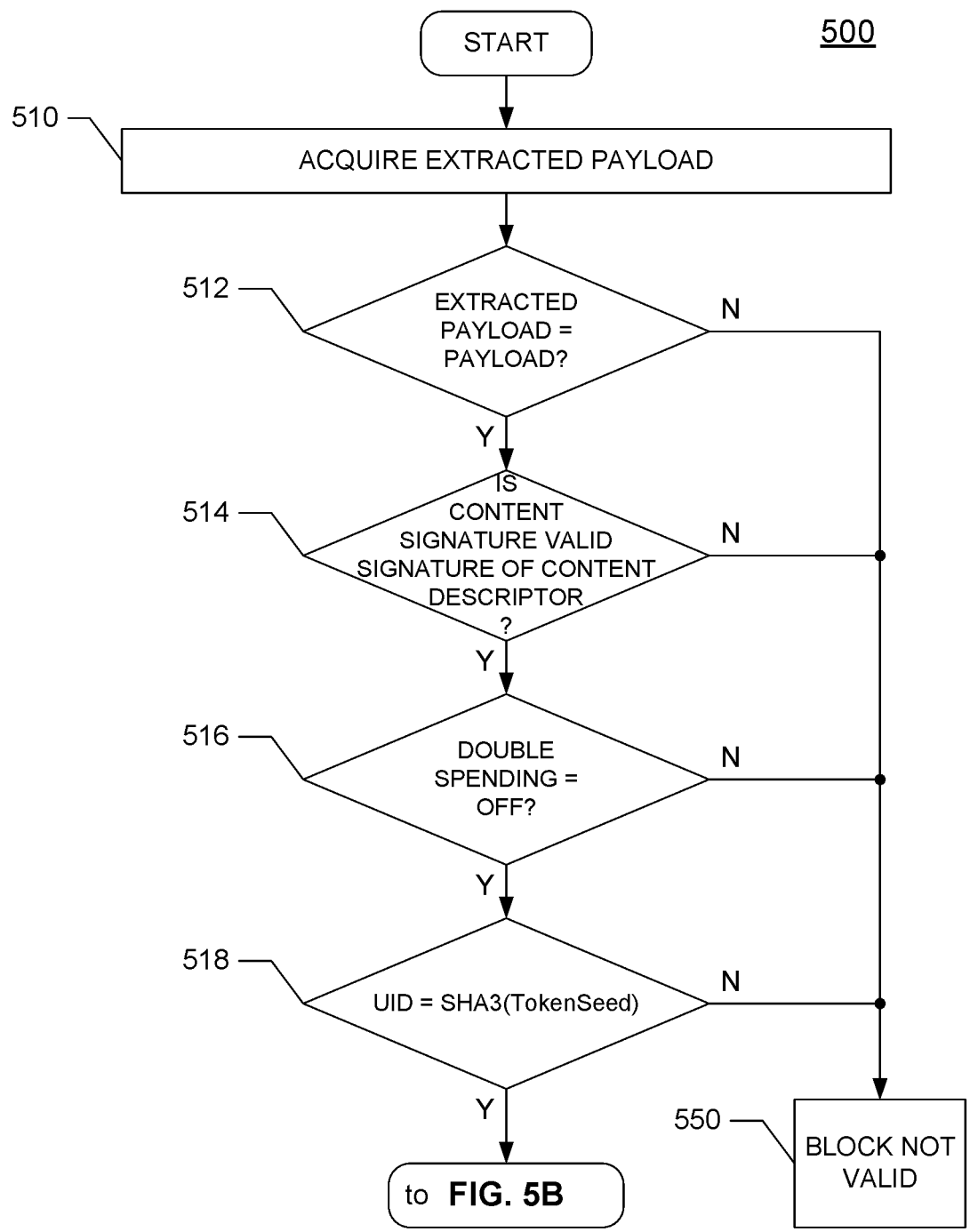
FIGS. 5A and 5B form a flow diagram illustrating a process for validating a first sale of a genuine instance of a digital good in accordance with another implementation of the present disclosure.
Figure 5B:
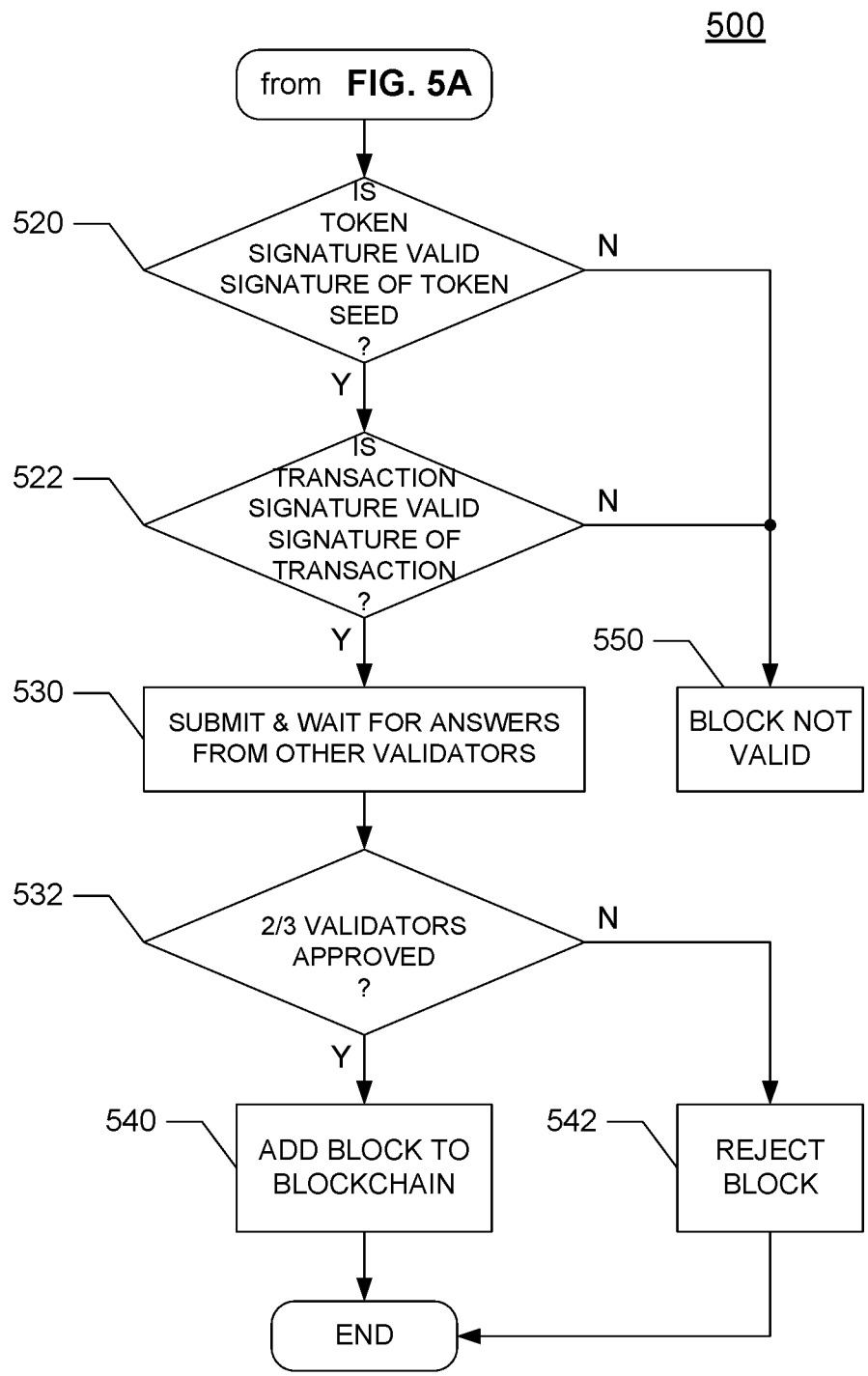

FIGS. 5A and 5B form a flow diagram illustrating a process 500 for validating a first sale of a genuine instance of a digital good in accordance with one implementation of the present disclosure. In one implementation, once the validator receives the transaction 300, the validator validates the transaction 300 by checking the validity of three elements, namely, the content descriptor 310, the ownership token 320, and the transaction signature 330.

In one implementation, checking the validity of the content descriptor 310 includes: (1) extracting and acquiring an extracted payload from the genuine instance (e.g., using an online watermark detector 460), at step 510; (2) verifying, at step 512, that the extracted payload is equal to the payload 314 (the genuine instance has an embedded watermark whose payload is "extracted payload". If the submitted content is genuine, the payload in the transaction should match the value carried by the genuine instance's watermark.); (3) verifying that the issuer certificate key 319 is a valid certificate issued by the certification authority 470; and (4) verifying, at step 514, that the content signature 318 is the actual signature of the content descriptor generated by Alice (i.e., Ver_RSA$_{\{Kpub\_issuer\}}$ (UniqueID|Payload|InstanceHash|IssuerCertificateKey|ContentSignature)==true)).

In one implementation, checking the validity of the content descriptor 310 also includes verifying that there is no double spending of the genuine instance, at step 516. The validator checks that there is no double spending by checking that there is not already a block issued by Alice in the blockchain 440 that has the corresponding payload 314 and the Unique ID 312.

In one implementation, checking the validity of the ownership token 320 includes: (1) verifying, at step 518, the validity of the token seed 422 (i.e., UniqueID=SHA3(TokenSeed)); and (2) verifying, at step 520, that the token signature 324 is the actual signature of a token seed 322 submitted by Alice (i.e., Ver_RSA$_{\{Kpub\_issuer\}}$ (TokenSeed TokenSignature)==true)).

In one implementation, checking the validity of the transaction signature 330 includes: (1) verifying, at step 522, that the transaction signature 330 is the actual signature of the transaction 300 by Alice (i.e., Ver_RSA$_{\{Kpub\_issuer\}}$ (ContentDescription|OwnershipToken|OwnerCertificateKey, ContentSignature)==true)); and (2) verifying that the owner certificate key 330 is a valid certificate (e.g., X509 certificate) issued by the certification authority 470.

In one implementation, once the three conditions are fulfilled (i.e., the validity of the content descriptor 310, the ownership token 320, and the transaction signature 330), the validator 480 generates a new block including a single transaction. In other embodiments, once the three conditions are fulfilled, the validator 480 generates a new block for the blockchain 440 including a plurality of transactions. If the block includes multiple transactions, the validator 480 validates all transactions. As illustrated in FIG. 1, the new block(s) includes the transaction (in the information section 112), the hash 114 of the previous block, and the hash 116 of the new block. The structure of the block and the type of hash function depends on the type of blockchain used.

In illustrated implementation of FIGS. 5A and 5B, the validator 480 submits the new block to the blockchain consensus mechanism, at step 530. The consensus mechanism depends on the technology used for the blockchain. In one embodiment, the consensus mechanism is the PBFT. Thus, if it is determined, at step 532, that at least ⅔ of the set of validators 480 approves the new block, then the new block is added to the blockchain 440, at step 540. That is, the blockchain 440 records that Bob owns the genuine instance 420 described by content descriptor 310 issued by Alice. Otherwise, the validator rejects the block, at step 542 and the block is not appended to the blockchain 440.

In step 532 of the illustrated implementation of FIG. 5B, the validators 480 within the consensus mechanism are asked to validate that a digital content is an actual genuine instance belonging to a particular owner.

Two example implementations are described below to illustrate the process to validate that a digital content is (1) an actual genuine instance belonging to (2) a particular owner.

In the first example implementation, Prudence wants to validate that a digital content is an actual genuine instance belonging to Bob. Thus, Bob provides to Prudence a pristine copy of genuine instance, his public key, and the Unique ID of the genuine instance. In one implementation, Prudence validates that the digital content is the actual genuine instance belonging to Bob by checking the most recent block (with the provided Unique ID) of the blockchain and verifying that the block corresponds to the provided pristine copy. Prudence also checks the identity of Bob.

To verify that the digital content is a "pristine copy" ("pristine copy" means bit-to-bit copy of the genuine instance), Prudence performs the following: (1) verifies that the hash of a copy of genuine instance is equal to the instance hash 316 (i.e., InstanceHash==SHA3(CopyOfGenuineInstance)); (2) extracts an extracted payload from the copy of genuine instance using a watermark detector 460; and (3) verifies that the extracted payload is equal to the payload 314. Further, to verify the identity of Bob, Prudence verifies that the owner certificate key 340 is still valid and that it matches the public key provided by Bob; Thus, Prudence (1) generates and sends a 1024-bit random number called 'Challenge' to Bob, who encrypts it with his private key ($K_{pri\_owner}$) to create and return 'Answer Challenge' (AnswerChallenge=RSA_ENC$_{\{K_{pri\_owner}\}}$(Challenge)) to Prudence; and (2) verifies that Challenge=RSA_DEC$_{\{K_{pub\_owner}\}}$(AnswerChallenge). If the above three conditions are met, Prudence validates that Bob owns the corresponding genuine instance. In this case, it is important that Bob provides a pristine copy of the genuine instance to Prudence. Otherwise, the calculated hash would not match the instance hash 316 recorded in the blockchain.

In the second example implementation, Prudence validates that Bob owns the genuine instance. For this validation, Bob provides to Prudence a copy of the genuine instance, Bob's public key, and the Unique ID. Prudence performs the following: (1) searches the blockchain for the most recent block with the unique ID 312; (2) extracts an extracted payload from the copy of the genuine instance using a watermark detector 460; (3) verifies that the extracted payload is equal to the payload 314; and (4) verifies the identity of Bob. In one implementation, the identity of Bob is verified by performing the following steps: (1) verifies that the public key provided by Bob matches the owner certificate key 340 and that the owner certificate key 340 is still valid; (2) generates and sends a 1024-bit random number ("challenge") to Bob; (3) receives an "answer challenge" from Bob, wherein the "answer challenge" was generated by Bob encrypting the "challenge" with Bob's private key (i.e., AnswerChallenge=RSA_ENC$_{\{K_{pri\_owner}\}}$(Challenge)); and (4) verifies that Challenge=RSA_DEC$_{\{K_{pub\_owner}\}}$(AnswerChallenge). If this is true, Prudence concludes that Bob owns the corresponding genuine instance. In the second example implementation, the verification does not require a pristine copy of the genuine instance. Thus, the copy of the genuine instance may be of a lower quality than the genuine instance, as long as the watermark extraction is successful. It shall be noted that Prudence does not prove that Bob has genuine instance but only that he owns it.

In another example implementation, Bob wants to resell his genuine instance to Ophelia. Bob is the seller and Ophelia is the future owner. In this implementation, notations $K_{pri\_Bob}$ and $K_{pub\_Bob}$ form Bob's key pair, and are, initially, the keys of the owner. Notations $K_{pri\_Ophelia}$ and $K_{pub\_Ophelia}$ form Ophelia's key pair, and are, initially, the keys of the new owner. In this example implementation, the resale may occur with or without an issuer.

In the example resale implementation without the issuer, the following steps are performed: (1) Bob forwards a pristine copy of the genuine instance to Ophelia; (2) Ophelia verifies that it is the expected instance (i.e., that it is the pristine copy of the genuine instance) as described in the previous section; (3) Bob verifies the identity of Ophelia: (a) Ophelia provides to Bob a certificate (e.g., the X509 certificate) of her public key; (b) Bob generates and sends a 1024-bit random number called 'challenge' to Ophelia; (c) Ophelia encrypts 'challenge' with Ophelia's private key ($K_{pri\_Ophelia}$) to generate AnswerChallenge=RSA_ENC$_{\{K_{pri\_Ophelia}\}}$(Challenge); (d) Ophelia returns AnswerChallenge to Bob; (e) Bob verifies that Challenge=RSA_DEC$_{\{K_{pub\_Ophelia}\}}$(AnswerChallenge); (4) Bob generates a new ownership token by signing the token seed with his private key ($K_{pri\_Bob}$); (5) Bob calculates the new transaction signature by signing the content descriptor, the new ownership token, and Ophelia's owner certificate key (i.e., TransactionSignature=Sign_RSA$_{\{K_{pri\_Bob}\}}$(ContentDescriptor|OwnershipToken|OpheliaCertificateKey)); (6) Bob builds the new transaction by aggregating the content descriptor, the new ownership token, Ophelia's owner certificate key, and the new transaction signature; and (7) Bob submits the transaction to a validator.

Figure 6A:
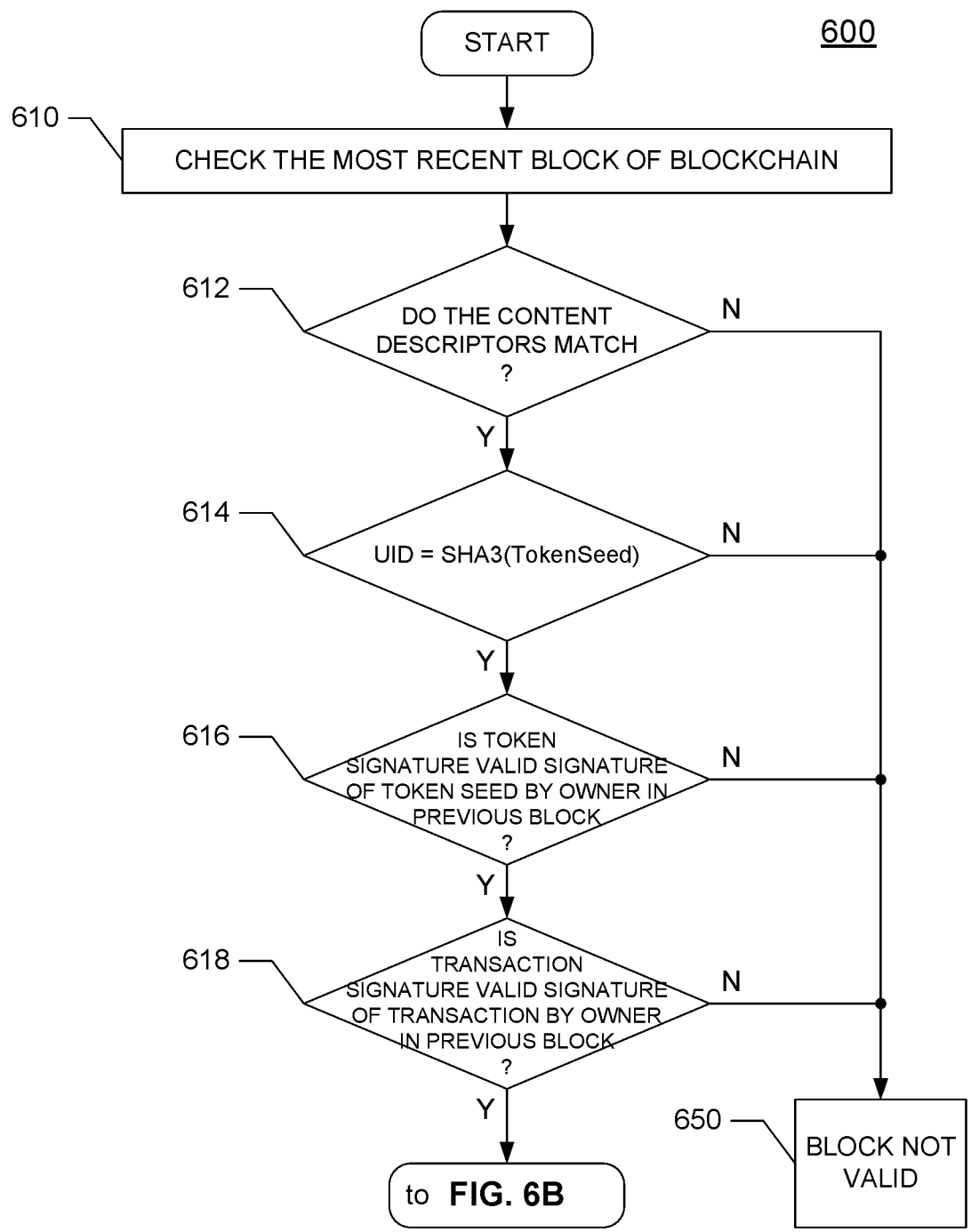
FIGS. 6A and 6B form a flow diagram illustrating a process for validating a resale of a genuine instance of a digital good without an issuer in accordance with one implementation of the present disclosure.
Figure 6B:
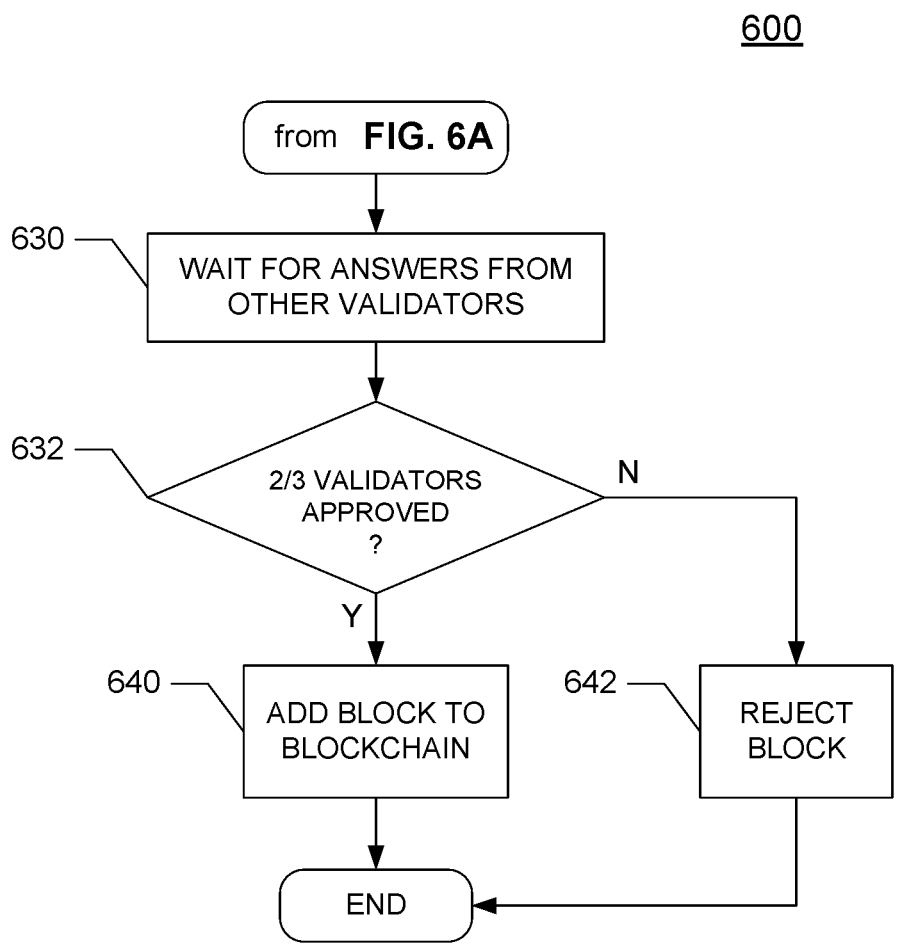

FIGS. 6A and 6B form a flow diagram illustrating a process 600 for validating a resale of a genuine instance of a digital good without an issuer in accordance with one implementation of the present disclosure. In the illustrated implementation of FIG. 6A, the validator searches for and retrieves the most recent block with Unique ID, at step 610. The validator then checks three conditions, (1) the validity of the content descriptor, (2) the validity of the new ownership token, and (3) the proposed transaction signature.

In the first implementation, the validity of the content descriptor is checked, at step 612, by matching the content descriptor in the extracted block to the content descriptor of the transaction submitted by Bob. If a match results, the process 600 continues. Otherwise, the block is declared as not valid, at step 650.

In the second implementation, the validity of the new ownership token is checked at steps 614 and 616. At step 614, the validity of the token seed is verified by checking that UniqueID=SHA3(TokenSeed). Then, at step 616, the token signature of the proposed transaction is verified by (1) extracting the owner certificate key of the retrieved block, and (2) verifying that the token signature of the proposed transaction is the actual signature of token seed by the owner of the owner certificate key of the retrieved block (i.e., Ver_RSA$_{\{K_{pub\_Bob}\}}$(TokenSeed, TokenSignature)==True). If the signatures match, then the signatory is the current owner, i.e., Bob.

In the third implementation, the proposed transaction signature is checked, at step 618, by verifying that the proposed transaction signature is the actual signature of the transaction by Bob (i.e., Ver_RSA$_{\{K_{pub\_Bob}\}}$(ContentDescriptor|OwnershipToken|CertificateOphelia, TransactionSignature)==True) and that the owner certificate key is a valid certificate issued by the certification authority.

If the above three implementations are checked and fulfilled, then the validator generates and submits the new block to the validators of the blockchain consensus mechanism, at step 630. Otherwise, the block is declared as not valid, at step 650.

In one implementation, if at least ⅔ of the set of validators approves the new block, then the new block is added to the blockchain. That is, the blockchain records that the genuine instance described by content descriptor issued by Alice (and previously owned by Bob) is now owned by Ophelia.

In the example resale implementation with the issuer, the following steps are performed: (1) Bob forwards a pristine copy of the genuine instance to Ophelia; (2) Ophelia verifies that it is the expected instance as described in the previous section; (3) Bob verifies the identity of Ophelia: (a) Ophelia provides to Bob a certificate (e.g., the X509 certificate) of her public key; (b) Bob generates and sends a 1024-bit random number called 'challenge' to Ophelia; (c) Ophelia encrypts 'challenge' with Ophelia's private key ($K_{pri\_Ophelia}$) to generate AnswerChallenge=RSA_ENC$_{\{K_{pri\_Ophelia}\}}$(Challenge); (d) Ophelia returns AnswerChallenge to Bob; (e) Bob verifies that Challenge=RSA_DEC$_{\{K_{pub\_Ophelia}\}}$(AnswerChallenge); (4) Alice verifies that Bob owns the genuine instance as described in the previous section; (5) Alice counts the number of blocks (n) in the blockchain related to Unique ID (i.e., the number of transactions related to the genuine instance); (11) Alice performs 100-n iterations of SHA3 on the initial seed to generate the new token seed (i.e., UniqueID=SHA3$_{100-n}$ (SHA3$_{99-n}$ ( . . . SHA3$_2$(SHA3$_1$ (Seed))))); (12) Alice calculates the token signature (i.e., TokenSignature=Sign_RSA$_{\{Kpri\_issuer\}}$ (TokenSeed)); (13) Alice returns the new ownership token securely to Bob; (14) Bob calculates the new transaction signature by signing the content descriptor, the new ownership token, and Ophelia's owner certificate key (i.e., TransactionSignature=Sign_RSA$_{\{Kpri\_Bob\}}$ (ContentDescriptor OwnershipToken OpheliaCertificateKey)); (15) Bob builds the new transaction by aggregating the content descriptor, the new ownership token, Ophelia's owner certificate key, and the new transaction signature; and (17) Bob transfers the transaction to a validator.

Figure 7A:
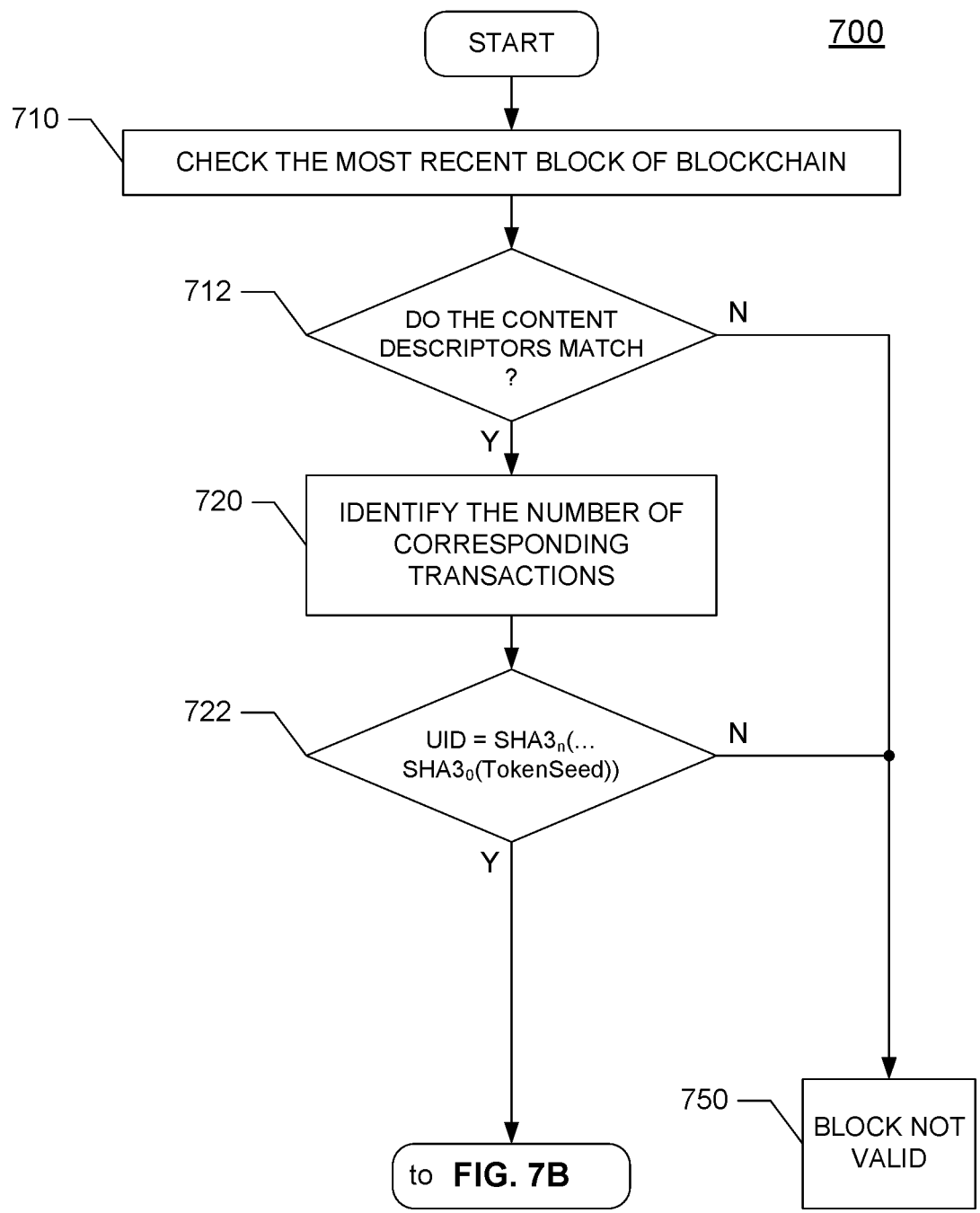
FIGS. 7A and 7B form a flow diagram illustrating a process for validating a resale of a genuine instance of a digital good with an issuer in accordance with one implementation of the present disclosure.
Figure 7B:
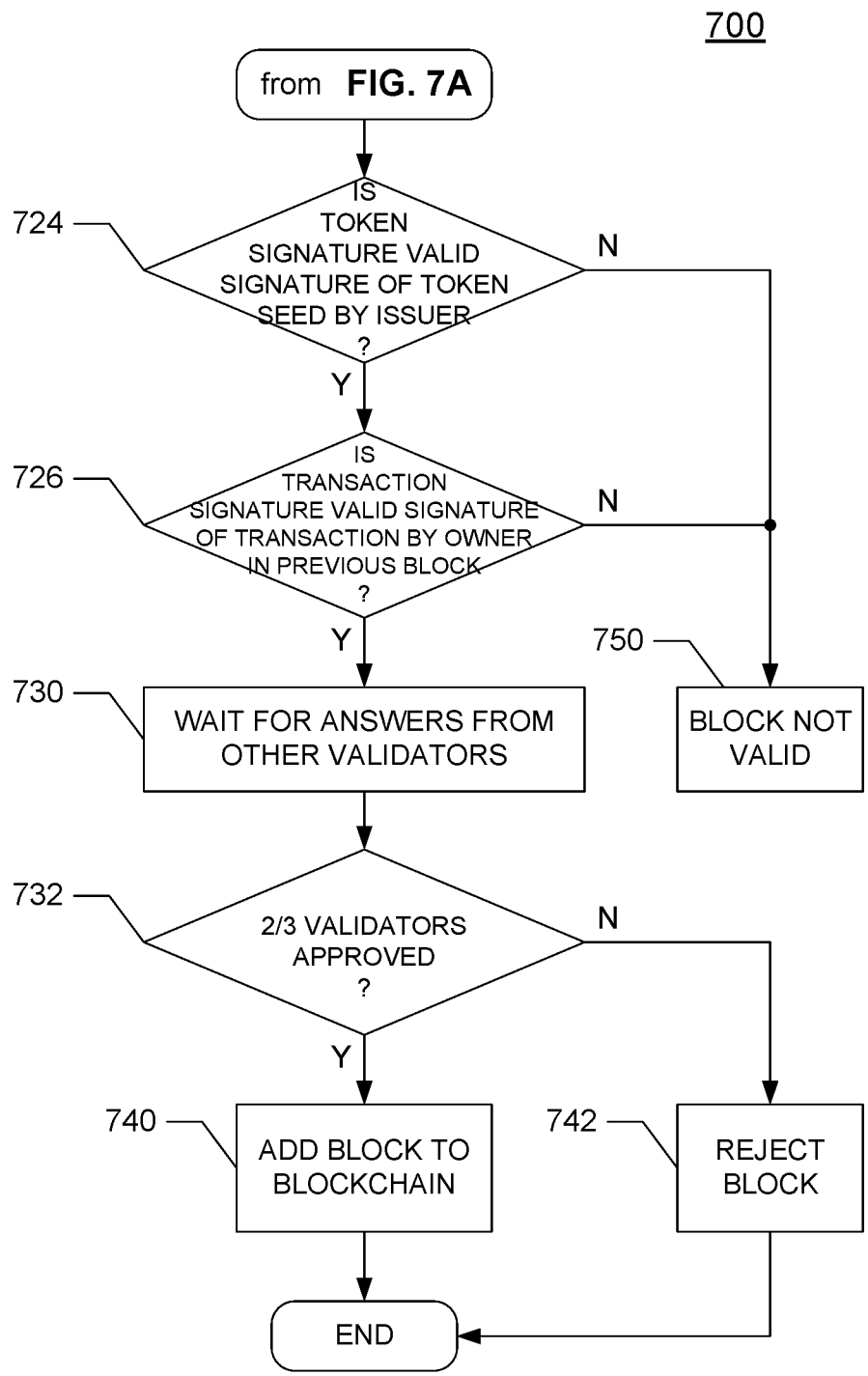

FIGS. 7A and 7B form a flow diagram illustrating a process 700 for validating a resale of a genuine instance of a digital good with an issuer in accordance with one implementation of the present disclosure. In the illustrated implementation of FIG. 7A, the validator searches for and retrieves the most recent block with Unique ID, at step 710. The validator then checks three conditions, (1) the validity of the content descriptor, (2) the validity of the new ownership token, and (3) the proposed transaction signature.

In the first implementation, the validity of the content descriptor is checked, at step 712, by matching the content descriptor in the retrieved block to the content descriptor of the transaction submitted by Bob. If a match results, the process 700 continues. Otherwise, the block is declared as not valid, at step 750.

In the second implementation, the validity of the new ownership token is checked at steps 720, 722, and 724. At step 720, the number of blocks (n) in the blockchain related to Unique ID is counted. At step 722, the validity of the token seed is verified by making n+1 iterations of SHA3 and checking that UniqueID=SHA3$_n$ ( . . . SHA3$_0$(TokenSeed)). Then, at step 724, the token signature of the proposed transaction is verified by verifying that the token signature of the proposed transaction is the actual signature of token seed by the public key held in the issuer certificate key of the retrieved block. If the signature does not match, then the block is declared as not valid, at step 750.

In the third implementation, the proposed transaction signature is checked, at block 726, by verifying that the proposed transaction signature is the actual signature of transaction by Bob (i.e., Ver_RSA$_{\{Kpub\_Bob\}}$(ContentDescriptor|OwnershipToken|CertificateOphelia, TransactionSignature)==True) and that the owner certificate key is a valid certificate issued by the certification authority.

If the above three implementations are checked and fulfilled, then the validator generates and submits the new block to the validators of the blockchain consensus mechanism, at step 730. Otherwise, the block is declared as not valid, at step 750.

In one implementation, if at least ⅔ of the set of validators approves the new block, then the new block is added to the blockchain. That is, the blockchain records that the genuine instance described by content descriptor issued by Alice (and previously owned by Bob) is now owned by Ophelia.

The difference between the two implementations (without issuer and with issuer) is that when the issuer is involved, the issuer acts as an additional trust referee. Only the issuer can generate a valid ownership token.

Accordingly, the above-described implementations provide for creating the scarcity with one unique instance of a digital good that will be the genuine instance and link that genuine instance to an owner. Any copies or derivatives are not genuine instances. Following examples verify that the concept works.

Alice cannot sell the same genuine instance to Bob and Charles. Assume that Alice provides the same digital file to Bob and Charles by using different seeds for Bob and Charles, resulting in two different UIDs. However, in this case, the validator would detect the two transactions with the same payload but different Unique IDs. This would be a violation detected by the consensus mechanism. Alice can make several genuine instances from the same original file. However, each genuine instance has a different watermark, thus, making each genuine instance unique.

Bob cannot resell the same genuine instance to Ophelia and Charles. In this case, the blockchain detects the double spending. Since the validators can only record one ownership, the second sale would be a violation, thus, not validated.

Eve cannot claim a genuine instance without owning it. Eve cannot pass the ownership test as the challenge response requires having Bob's private key.

Bob cannot keep a genuine instance once he sells it. Bob may keep a pristine copy of the sold genuine instance. However, Bob will not pass the ownership test as this test requires the private key of the current owner registered in the blockchain. The blockchain guarantees the transfer of ownership.

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. For example, although the specification describes the validation application performing hashing functions using the SHA3 program, other hashing functions can be used in place. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for processing a genuine instance of a digital good using a blockchain to create scarcity, the method comprising:
   registering, by a processor, a transfer of an ownership of the genuine instance using a plurality of transactions,
   the genuine instance uniquely identified by a content descriptor which is cryptographically linked to an ownership token and includes intrinsic characteristics of the genuine instance,
   wherein the intrinsic characteristics comprise:
   a unique identifier of the genuine instance which is calculated as a one-way cryptographic hash of a token seed, wherein the calculation applies the one-way cryptographic hash iteratively based on the plurality of transactions;
   a payload of an imperceptible watermark embedded in the genuine instance;
   an instance hash of the plurality of transactions; and
   a content signature signed by a previous owner of a previous transaction,
   wherein the intrinsic characteristics identify the genuine instance to be one unique instance of the digital good that is not a copy or derivative and enable the genuine instance to be linked to a new owner,
   wherein the ownership token includes the token seed and a token signature, wherein the token seed is calculated based on a predetermined number and the plurality of transactions;
   validating, by the processor, a transaction subsequent to the plurality of transactions by a plurality of validators, wherein validating the transaction comprises:
   verifying the validity of the content signature;
   verifying the validity of the ownership token, wherein verifying the validity of the ownership token comprises:
   calculating a hashed version of the token seed by iteratively applying the one-way cryptographic hash to the token seed based on the plurality of transactions;
   comparing the hashed version of the token seed to the unique identifier; and
   receiving validation approval from at least two-thirds of the plurality of validators using a blockchain consensus mechanism; and
   recording, by the processor, the genuine instance of the digital good linked to the new owner by recording the transaction in the blockchain once the transaction has been validated.

2. The method of claim 1, wherein registering the ownership of the genuine instance is performed by an issuer.

3. The method of claim 2, wherein verifying the validity of the ownership token in a resale comprises: verifying the validity of the token seed; and verifying that the token signature is an actual signature of the token seed submitted by the previous owner in a previous transaction.

4. The method of claim 2, wherein each transaction comprises: a transaction signature signed by the issuer; and a certificate key of the new owner.

5. The method of claim 2, further comprising generating, by the issuer, an initial random seed, wherein the initial random seed enables the creation of a finite series of successive token seeds, each token seed being a one-way cryptographic hash of the token seed generated in a previous transaction.

6. The method of claim 5, further comprising generating the unique identifier of the genuine instance with a single iteration of a one-way hash function of a last element of the finite series for an initial sale of the genuine instance.

7. The method of claim 1, further comprising: appointing a certification authority by the plurality of validators; and generating key pairs and associated certificates used for identity management by the certification authority.

8. The method of claim 7, wherein generating the key pairs and associated certificates comprises: verifying that the associated certificates did not expire; and verifying that the associated certificates were signed by the certification authority.

9. The method of claim 1, wherein the content descriptor also comprises a set of visible marks that is unique to the genuine instance.

10. The method of claim 1, wherein the ownership token also comprises the token signature of the token seed.

11. The method of claim 1, wherein registering the ownership of the genuine instance is performed by the previous owner in a previous transaction.

12. The method of claim 11, further comprising: generating, by the previous owner in the previous transaction, a new ownership token by signing the token seed with a private key of the new owner in the previous transaction; and generating a suite of linked token seeds.

13. A non-transitory computer-readable storage medium storing a computer program to process a genuine instance of a digital good using a blockchain to create scarcity, the computer program comprising executable instructions that cause a computer to:
   register a transfer of an ownership of the genuine instance using a plurality of transactions,
   the genuine instance uniquely identified by a content descriptor which is cryptographically linked to an ownership token and includes intrinsic characteristics of the genuine instance,
   wherein the intrinsic characteristics comprise:
   a unique identifier of the genuine instance which is calculated as a one-way cryptographic hash of a token seed wherein the calculation applies the one-way cryptographic hash iteratively based on the plurality of transactions;
   a payload of an imperceptible watermark embedded in the genuine instance;

an instance hash of the plurality of transactions; and a content signature signed by a previous owner of a previous transaction, wherein the intrinsic characteristics identify the genuine instance to be one unique instance of the digital good that is not a copy or derivative and enable the genuine instance to be linked to a new owner, wherein the ownership token includes the token seed and a token signature, wherein the token seed is calculated based on a predetermined number and the plurality of transactions;

validate a transaction subsequent to the plurality of transactions by a plurality of validators, wherein the transaction is validated by verifying the validity of the content signature, and verify the validity of the ownership token, wherein verifying the validity of the ownership token comprises:

calculate a hashed version of the token seed by iteratively applying the one-way cryptographic hash to the token seed based on the plurality of transactions;

compare the hashed version of the token seed to the unique identifier; and receive validation approval from at least two-thirds of the plurality of validators using a blockchain consensus mechanism; and record the genuine instance of the digital good linked to the new owner by recording the transaction in the blockchain once the transaction has been validated.

14. A system for processing a genuine instance of a digital good using a blockchain to create scarcity, the system comprising:

an issuer configured to register a transfer of an ownership of the genuine instance using a plurality of transactions, the genuine instance uniquely identified by a content descriptor which is cryptographically linked to an ownership token and includes intrinsic characteristics of the genuine instance, wherein the intrinsic characteristics comprise:

a unique identifier of the genuine instance which is calculated as a one-way cryptographic hash of a token seed, wherein the calculation applies the one-way cryptographic hash iteratively based on the plurality of transactions;

a payload of an imperceptible watermark embedded in the genuine instance; an instance hash of the plurality of transactions; and a content signature signed by a previous owner of a previous transaction, wherein the intrinsic characteristics identify the genuine instance to be one unique instance of the digital good that is not a copy or derivative and enable the genuine instance to be linked to a new owner, wherein the ownership token includes the token seed and a token signature, wherein the token seed is calculated based on a predetermined number and the plurality of transactions; and a plurality of validators configured to validate a transaction subsequent to the plurality of transactions, wherein the transaction is validated by verifying the validity of the content signature, and verifying the validity of the ownership token, wherein verifying the validity of the ownership token comprises:

calculating a hashed version of the token seed by iteratively applying the one-way cryptographic hash to the token seed based on the plurality of transactions;

comparing the hashed version of the token seed to the unique identifier; and receiving validation approval from at least two-thirds of the plurality of validators using a blockchain consensus mechanism, wherein the genuine instance of the digital good linked to the new owner is recorded by recording the transaction in the blockchain once the transaction has been validated by the plurality of validators.

15. The system of claim 14, wherein the intrinsic characteristics comprise: a unique identifier of the genuine instance which is calculated as a one-way cryptographic hash of the token seed; a payload of an imperceptible watermark embedded in the genuine instance; an instance hash of the plurality of transactions; and a content signature signed by the previous owner in a previous transaction.

16. The system of claim 15, further comprising a watermark detector configured to detect and extract the payload of the imperceptible watermark embedded in the genuine instance.

17. The system of claim 14, wherein the ownership token includes information that links the genuine instance to the new owner.

18. The system of claim 14, further comprising a certification authority configured to generate key pairs and associated certificates used for identity management.

* * * * *